United States Patent [19]
Kato et al.

[11] 4,330,802
[45] May 18, 1982

[54] MAGNETIC CASSETTE TAPE RECORD AND PLAY APPARATUS

[75] Inventors: Toshikazu Kato; Sinichi Saitou; Seizo Watanabe, all of Hachioji; Toyoo Nishiyama, Musashimurayama; Misao Shimdda, Hamura; Tutomu Shibata, Hachioji; Kenji Kimura, Tachikawa; Ken Satoh, Akikawa, all of Japan

[73] Assignee: Olympus Optical Co., Ltd., Tokyo, Japan

[21] Appl. No.: 131,105

[22] Filed: Mar. 18, 1980

[30] Foreign Application Priority Data

Apr. 2, 1979 [JP] Japan ................ 54-39514

[51] Int. Cl.³ .................. G11B 5/008; G11B 15/60
[52] U.S. Cl. ........................ 360/96.6; 360/130.31; 360/130.32
[58] Field of Search .............. 360/96.5, 96.6, 93, 360/105, 104, 130.2, 130.3, 130.31, 130.32; 235/479, 283; 308/36.1; 240/197, 179

[56] References Cited

U.S. PATENT DOCUMENTS

| | | | |
|---|---|---|---|
| 3,372,938 | 3/1968 | Hoag | 360/130.32 |
| 3,420,460 | 1/1969 | Tatter | 360/130.32 |
| 3,506,271 | 4/1970 | Greifenhagen | 360/130.32 |
| 4,011,592 | 3/1977 | Kawada | 360/130.31 |

FOREIGN PATENT DOCUMENTS 2015492  10/1970  Fed. Rep. of Germany.

Primary Examiner—Robert M. Kilgore
Attorney, Agent, or Firm—Frishauf, Holtz, Goodman and Woodward

[57] ABSTRACT

A magnetic cassette tape record and play apparatus wherein the magnetic head thereof is fixed, comprises a push member cooperating with an operation button and which is so disposed as to abut against a pad spring received in a tape cassette. When the tape cassette is loaded or ejected in the stop mode, the push member is pressed against the pad spring to deform it against its urging force, thereby locking the cassette tape in a position untouched by the magnetic head. When the operation button is depressed for the recording or reproduction mode, then the push member is removed from the pad spring, thereby causing the pressure pad to be pressed against the magnetic head with the cassette tape disposed between the pressure pad and the magnetic head.

8 Claims, 4 Drawing Figures

MAGNETIC CASSETTE TAPE RECORD AND PLAY APPARATUS

BACKGROUND OF THE INVENTION

This invention relates to a magnetic cassette tape record and play apparatus.

With the conventional magnetic cassette tape recorder and play apparatus, a magnetic head is set on a fitting block or head mount which in turn is mounted on a magnetic head-supporting board jointly movable with an operation button. When the magnetic head-supporting board slides or is rotated when a reproduction or recording mode is selected, then the magnetic head is moved to contact a tape. When the magnetic head is so moved, difficulties arise in that the magnetic head-supporting board is shoved, each time the recording or reproduction mode is performed, subjecting the head mount to mechanical shocks with the resultant dislocation or azimuth displacement of the magnetic head itself, failing to locate the magnetic head with high precision relative to a cassette tape.

SUMMARY OF THE INVENTION

It is accordingly an object of this invention to provide a magnetic cassette tape record and play apparatus capable of locating a magnetic head with high precision relative to a cassette tape. To this end, the present invention provides a magnetic cassette tape record and play apparatus, wherein the magnetic head is immovably fixed, when taken into or out of a tape cassette, a pressure pad and cassette tape are locked in a position untouched by the magnetic head, and when a recording or reproduction mode is selected, the pressure pad and cassette tape are unlocked, thereby enabling the cassette tape to contact the magnetic head.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
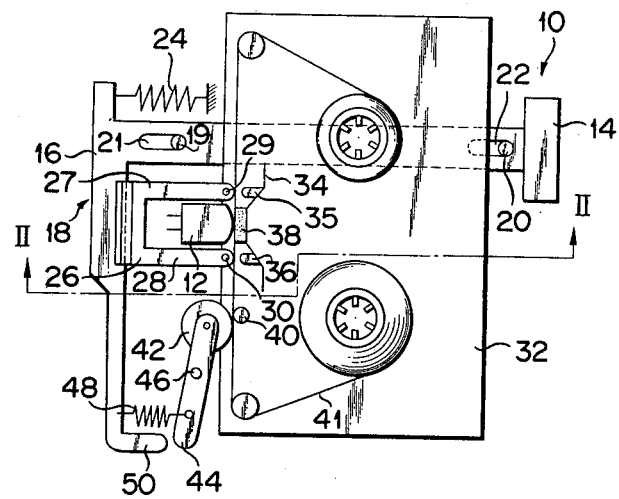
FIG. 1 is a schematic plan view of a magnetic cassette tape record and play apparatus according to one embodiment of this invention.
Figure 2:
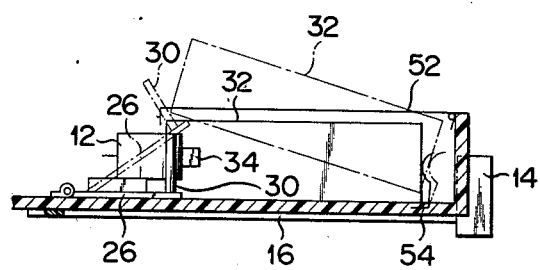
FIG. 2 is a sectional view on line II—II of FIG. 1.
Figure 3:
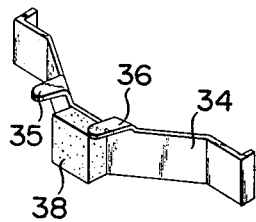
FIG. 3 is a perspective view of a pad spring received in a tape cassette.

Referring to a magnetic cassette tape record and play apparatus 10 of FIG. 1 according to one embodiment of this invention, a magnetic head 12 for a recording or reproduction mode, for example, is fixed to a substrate or a base plate of a cassette tape record and play apparatus. An operation button 14 of, for example, a reproduction mode is integrally formed with an operation board 16 to constitute an operation means 18. The operation board 16 of the operation means 18 is guided by guide pins 19, 20 mounted on the substrate and guide holes 21, 22 of the operation board 16. This operation board 16 is generally urged by a tensile coil spring 24 in the direction in which the operation button 14 is made to protrude for a stop mode. A forked push member 26 is rotatably mounted on the operation board 16. Push pins 29, 30 are mounted on respective prongs or arms 27, 28 of the forked push member 26 so as to project therefrom, as seen in FIG. 2. The push member 26 is set by a torsion spring (not shown) in a position turned upward from the operation board 16 as shown in FIG. 2. A pad spring 34 received in a tape cassette 32 has a pair of bent attachments 35, 36 which are integrally formed on the upper side thereof as shown in FIG. 3 and against which push pins 29, 30 are to be pressed. Further, a pressure pad 38 is fitted to the center of the pad string 34. The bent attachments 35, 36 are symmetrically arranged with respect to the pressure pad 38. A magnetic tape 41 is clamped between a capstan shaft 40 and pinch roller 42. A pinch roller lever 44, one end of which supports the pinch roller 42 is provided near the operation board 16 in a state rotatable about a pivot pin 46. The pinch roller lever 44 is so urged as to be clockwise rotated about the pivot pin 46 by a tension coil spring 48 stretched between the other end of the pinch roller lever 44 and the operation board 16. In this case, the same effect as offered by the tension coil spring 48 can be obtained if a torsion spring is instead wound about the pivot pin 46. A protruding member 50 is formed at one end of the operation board 16. For the stop mode, the protruding member 50 is pressed against the other end of the pinch roller lever 44, causing the lever 44 to be rotated counterclockwise against the urging force of the tension coil spring 48 and consequently removing the pinch roller 42 from engagement with the capstan shaft 40.

During the stop mode before the loading of a tape cassette, the operation board 16 is urged by the tension coil spring 24 in the direction in which the operation button 14 is pushed outward (i.e., to the right in FIG. 1). The protruding member 50 abuts against the pinch roller lever 44, causing the pinch roller 42 to be removed from the capstan shaft 40. The push member 26 mounted on the operation board 16 is set in an upward rotated position (FIG. 2) by the urging force of a torsion spring (not shown). A tape cassette 32 is loaded by the steps (FIG. 2) of opening a cassette cover 52, bringing the tape cassette 32 into engagement with the right end of the push member 26, and pushing down the tape cassette 32 while depressing a tape cassette push spring 54. When the tape cassette 32 is pushed down, the push member 26 is rotated clockwise. At this time, the push pins 29, 30 are pressed first against the cassette tape 41 and then against the bent attachments 35, 36 of the pad spring 34. As a result, the pad spring 34 is deformed for retraction. The bent attachments 35, 36 of the pad spring 34 cause the pad spring 34 to be deformed to a great extent. Further, if necessary, the stroke of the push pins 29, 30 may be decreased. When moved into the tape cassette 32, the cassette tape 41 and pressure pad 38 are locked in a position untouched by the magnetic head. Therefore, the tape cassette 32 can be smoothly loaded without damaging the cassette tape 41, pad 38 and magnetic head 12. If a single bent attachment (35 or 36) is provided, then the pad spring 34 is not moved parallel with the cassette tape 41, thus failing to reliably occupy a position untouched by the magnetic head 12. With a magnetic cassette tape record and play apparatus embodying this invention, however, the bent attachments 35, 36 are symmetrically arranged with respect to the pressure pad 38 on opposite sides of the pressure pad 38. Therefore, the pad spring 34 is carried parallel with the cassette tape 41 and consequently is brought to a position untouched by (i.e., spaced from) the magnetic head 12.

When an operation button 14 corresponding to, for example, a play mode is depressed against the urging force of the tension spring 24, the operation board 16 is moved while being guided by the guide pins 19, 20 to a position indicated in FIG. 1. At the depression of the operation button 14, the push member 26 is moved with the operation board 16. As a result, the push pins 29, 30 of the push member 26 are removed from the bent attachments 35, 36 of the pad spring 34 and also from the cassette tape 41. Where the push pins 29, 30 are retreated to a position not touched by the cassette tape 41, the urging force of the pad spring 34 causes the cassette tape 41 and pad 38 to be tightly attached to, or pressing against, the magnetic head 12. When the protruding member 50 is removed from the pinch roller lever 44 due to the movement of the operation board 16, then the pinch roller lever 44 is clockwise rotated about the pivot pin 46 by the urging force of the tension spring 48, thereby causing the cassette tape 41 to be clamped between the pinch roller 42 and capstan shaft 40. Thus the magnetic cassette tape recorder is set for the reproduction mode. Obviously, a record button sets the cassette tape record and play apparatus for a record mode.

The tape cassette 32 is ejected by returning the operation button 14 to the original protruding position for the stop mode. In the stop mode, the push pins 29, 30 are pressed, as previously described, against the cassette tape 41 and bent attachments 35, 36 of the pad spring 34 to separate the cassette tape 41 and pressure pad 38 from the magnetic head 12. The protruding member 50 abuts against the pinch roller lever 44, causing the pinch roller 42 to leave the capstan shaft 40. Accordingly, the tape cassette 32 can be easily ejected.

The tightly fixed magnetic head 12 of the cassette tape record and play apparatus embodying this invention is not subject to an azimuth displacement or any other form of disclocation, but can be set in place with high precision relative to the cassette tape 41. Further, since the magnetic head 12 is set so as to be immovable, a lead line drawn from the magnetic head is not likely to be broken. The problem arising from the fixation of the magnetic head 12, that is, the contact of the pressure pad 38 with the magnetic head 12 via the cassette tape 41 when the tape cassette 32 is taken into or out of the apparatus is prevented by the actuation of the push pins 29, 30 of the push member 26 moved with the operation button 14. In the recording or reproduction mode, however, the pins 29, 30 are unactuated to bring the cassette tape 41 into contact with the magnetic head. The contact of the pressure pad 38 and cassette tape 41 with the magnetic head 12 is properly controlled when the operation button 14 is depressed. Therefore, a magnetic cassette tape record and play apparatus according to the foregoing embodiment of this invention has a simple arrangement and can be easily operated without damaging the pressure pad 38, cassette tape 41, and magnetic head 12.

Figure 4:
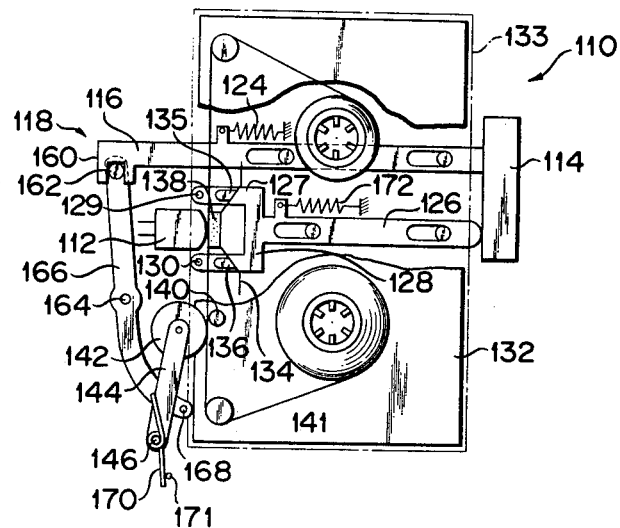
FIG. 4 is a schematic plan view of a magnetic cassette tape record and play apparatus according to another embodiment of the invention.

There will now be described by reference to FIG. 4 a magnetic cassette tape record and play apparatus 110 according to another embodiment of the invention. This embodiment is of the so-called kangaroo type wherein a tape cassette 132 is inserted into a cassette holder 133, and thereafter is set in a prescribed position. However, it is to be expressly understood that the technical concept of this invention is not restrictively applied to the kangaroo type tape cassette-loading system, but to the conventional tape cassette loading system as well. Referring to the second embodiment of FIG. 4, operation means 118 comprises an operation board 116 on which an operation button 114 corresponding to, for example, a play mode is integrally formed. A forked push member 126 disposed parallel with the operation board 116 has two prongs or arms 127, 128. Push pins 129, 130 are respectively mounted on the arms 127, 128 to project therefrom. The operation means 118 is provided at one end with a pin 162 engageable with a forked end portion 160 of the operation board 116. The operation means 118 further comprises a lever 166 rotatable about a pivot pin 164. The rotatable lever 166 has a pin 168 extending upward from the other end thereof. This pin 168 is engageable with a pinch roller lever 144 which is so urged as to be rotated clockwise about the pivot pin 146 by a torsion spring 170 wound about the pivot pin 146. One end of the torsion spring 170 is pressed against one side edge of the pinch roller lever 144, and the other end of the torsion spring 170 abuts against a stopper pin 171. The operation board 116 and push member 126 are urged by the corresponding tension coil springs 124, 172 to project outward while being guided by a guide pin and guide hole. The pushed position of the push member 126 is defined when the forward end of the push member 126 is pressed against the backside of the operation button 114.

In the stop mode, the operation board 116 and push member 126 are so urged as to be pushed outward by the corresponding tension springs 124, 172. Under this condition, the lever 166 is clockwise rotated about the pivot pin 164. Since, at this time, the pin 168 abuts against the side wall of the pinch roller lever 144, the pinch roller lever 144 is rotated counterclockwise about the pivotal pin 146 against the urging force of the torsion 170. Therefore, the pinch roller 142 is removed from the capstan shaft 140.

Like the tape cassette 32 of the preceding embodiment, the tape cassette 132 received in the cassette holder 133 contains a cassette tape 141, and a pad spring 134 provided with bent attachments 135, 136. When the tape cassette 132 is loaded, the moving cassette tape 141 and bent attachments 135, 136 are engaged with the push pins 129, 130. As a result, the pad spring 134 is depressed inward, thereby preventing the magnetic head 112 from being touched by the cassette tape 141 and pressure pad 138. When, after the loading of the tape cassette 132, the operation button 114 is depressed against the urging force of the tension spring 124, then the lever 166 is rotated counterclockwise about the pivot pin 164, because the pin 162 of the lever 166 is engaged with the forked end portion 160 of the operation board 116. At the counterclockwise rotation of the lever 166, the pin 168 is removed from the lateral wall of the pinch roller lever 144. As a result, the pinch roller lever 144 is rotated clockwise about the pivot pin 146 by the urging force of the torsion spring 170, causing the cassette tape 141 to be clamped between the pinch roller 142 and capstan shaft 140. When depressed, the operation button 114 is pressed against the outer or right end of the push member 126, which in turn is moved to the left with the operation button 114 against the urging force of the tension spring 172. The operation button 114 is further pushed, until the push pins 129, 130 of the push member 126 are removed from contacting the cassette tape 141 as shown in FIG. 4. As a result, the cassette tape record and play apparatus is set for the desired reproduction mode. The tape cassette 132 is ejected by retracting the operation button 114 for the stop mode to the original position at which the button 114 protrudes from the cassette tape record and play apparatus. In this stop mode, the cassette tape 141 and pressure pad 138 are removed from contact with the magnetic head 112 by the push pins 129, 130. The pinch roller 142 is also removed from the capstan shaft 140 by the lever 166. Therefore, the tape cassette 132 can be ejected smoothly.

According to a magnetic cassette tape record and play apparatus embodying this invention, the magnetic head is immovably set as described above. The push member movable jointly with the operation button is disposed in a position capable of abutting against the pad spring received in the tape cassette. When the tape cassette is loaded or ejected when the machine is in the stop mode, the push member is pressed against the pad spring, which in turn is deformed inward. As a result, the pressure pad and cassette tape can be set in a position untouched by (i.e., spaced from) the magnetic head. When the operation button is depressed for the recording or reproduction mode, then the push member is removed from the pad spring, thereby causing the pressure pad to be pressed against the magnetic head with the cassette tape disposed between the pressure pad and magnetic head.

With the magnetic cassette tape record and play apparatus of this invention, the magnetic head is immovably set, and saved from an azimuth displacement and can be located with high precision relative to the cassette tape. When the tape cassette is loaded or ejected at the stop mode, the pressure pad and cassette tape are locked in a position untouched by the magnetic head. At the time of recording or reproduction the tape and pressure pad are unlocked, thereby enabling the tape to be pressed against the magnetic head. Therefore the cassette tape record and play apparatus can be easily set for the second or play mode without damaging the magnetic head, cassette tape and pressure pad.

What we claim is:

1. A magnetic cassette tape recording and playing apparatus for use with a tape cassette containing tape, a pressure pad and a pad spring on which the pressure pad is mounted, the apparatus comprising:
   operation means provided with an operation button for setting the operation mode of the apparatus;
   a fixed magnetic head capable of abutting against the pressure pad of the pad spring received in a tape cassette; and
   a push member cooperatively coupled with said operation means such that when a tape cassette is loaded or ejected while the apparatus is in the stop mode, said push member is pressed against the pad spring via the tape in the tape cassette to deform the pad spring inwardly of the tape cassette against the urging force of the pad spring, thereby moving the tape in the cassette to a position untouched by the magnetic head, and, when a tape cassette is loaded or ejected when the operation button is set for setting the apparatus in the recording or reproduction mode, said push member is removed by said operation means from the pad spring, thereby causing the pressure pad to be pressed, by the pad spring, against the fixed magnetic head with the cassette tape disposed between the pressure pad and magnetic head.

2. The apparatus according to claim 1, wherein:
   the pad spring comprises a lateral wall, and a pair of bent attachment crosswise extending from the lateral wall of the pad spring on opposite sides of the pressure pad, said pair of bent attachments being symmetrical with respect to the pressure of the pad spring;
   the push member comprises an abutment capable of being pressed against the bent attachment of the spring, and urging means for urging the abutment toward the pad spring; and when the apparatus is in the stop mode, the abutment of the push member is pressed against the bent attachment of the pad spring by the urging force of the urging means, thereby deforming the pad spring.

3. The apparatus according to claim 2, wherein the push member is forked shape having two prongs; and the abutment comprises a push pin fixed to the forward end of the respective prongs.

4. The apparatus according to any one of claims 1, 2 or 3, wherein the push member is set above the operation means in a state whereby it is rotatable by the urging force of urging means, and, during the loading of the tape cassette, said push member is engaged with the tape cassette and is rotated from an upper to a lower position against the urging force of said urging means.

5. The apparatus according to claim 4, wherein:
   the operation means is slideable;
   a tension spring is stretched between the operation means and a rotatable pinch roller lever, one end of the pinch roller lever supporting a pinch roller;
   the pinch roller lever is rotated by the urging force of the tension spring, thereby causing the pinch roller to be engaged with a capstan shaft of the apparatus; and
   when the apparatus is in the stop mode, the operation means is engaged with the pinch roller lever, causing the pinch roller to be removed from the capstan shaft against the urging force of the tension spring.

6. The apparatus according to any one of claims 1, 2 or 3, wherein the operation button is fitted to a slidable operation board; and the push member is arranged parallel with the operation board in a state slidable in the same direction as that in which the operation board is slidable.

7. The apparatus according to claim 6, wherein the operation means comprises a rotatable lever, one end of which is engaged with the operation board, and the other end of which is engaged, in the stop mode, with a rotatable pinch roller lever, one end of the pinch roller lever supporting the pinch roller so urged by urging means as to be engaged with a capstan shaft, thereby causing the pinch roller to be removed from the capstan shaft against the urging force of the urging means.

8. The apparatus according to any one of claims 1, 2 or 3, further comprising a pinch roller mounted for cooperation with a rotatably driven capstan, said pinch roller being on the same side of the tape as the fixed magnetic head when the cassette is loaded in the apparatus.

* * * * *

UNITED STATES PATENT AND TRADEMARK OFFICE
CERTIFICATE OF CORRECTION

PATENT NO. : 4,330,802

DATED : May 18, 1982

INVENTOR(S) : Toshikazu KATO, et al

It is certified that error appears in the above—identified patent and that said Letters Patent is hereby corrected as shown below:

COLUMN 6, line 10 (claim 2), after "with respect to the pressure"

insert --pad--.

Signed and Sealed this

Thirty-first Day of August 1982

[SEAL]

Attest:

GERALD J. MOSSINGHOFF

Attesting Officer   Commissioner of Patents and Trademarks